United States Patent [19]

Hammer et al.

[11] Patent Number: 5,535,312

[45] Date of Patent: Jul. 9, 1996

[54] APPARATUS AND METHOD FOR MANAGING MEMORY IN A PRINTING SYSTEM

[75] Inventors: Tim D. Hammer, Ontario; Colleen R. Enzien, Penfield; Juan C. Acebo, Webster; M. John Ludlow, Rochester; Keith A. May, Palmyra, all of N.Y.

[73] Assignee: Xerox Corporation, Stamford, Conn.

[21] Appl. No.: 10,104

[22] Filed: Jan. 28, 1993

[51] Int. Cl.$^6$ ....................................................... H04N 1/21
[52] U.S. Cl. ............................................. 395/115; 395/116
[58] Field of Search .................................... 395/115, 114, 395/105, 101, 116, 111, 112, 110; 364/519

[56] References Cited

U.S. PATENT DOCUMENTS

| | | | |
|---|---|---|---|
| 5,047,957 | 9/1991 | Ikenoue | 364/519 |
| 5,142,667 | 8/1992 | Dimperio et al. | 395/115 |
| 5,155,845 | 10/1992 | Beal et al. | 395/575 |
| 5,220,645 | 6/1993 | Nakajima | 395/114 |
| 5,253,081 | 10/1993 | Shoji et al. | 395/116 |
| 5,347,368 | 9/1994 | Mochizuki | 358/296 |
| 5,377,311 | 12/1994 | Carlock et al. | 395/115 |

Primary Examiner—Raymond J. Bayerl
Assistant Examiner—Steven P. Sax
Attorney, Agent, or Firm—Gary B. Cohen

[57] ABSTRACT

A printing system for producing prints, with each print including an image represented by image data, is provided. The printing system includes a memory for storing and buffering the image data of a selected print and an image output terminal, communicating with the memory, for printing the image of the selected print on a substrate. The printing system further includes marking software, operatively associated with the image output terminal, for determining a value for the maximum amount of memory to be used in printing selected ones of the prints, and a resource manager, communicating with the marking software and the memory, for managing the memory. In practice, the resource manager receives the value from the marking software and the substrate is fed to the image output terminal when the resource manager determines that the value corresponds with a selected amount of available memory space and that an additional predetermined condition is satisfied.

9 Claims, 11 Drawing Sheets

APPARATUS AND METHOD FOR MANAGING MEMORY IN A PRINTING SYSTEM

The present invention relates generally to resource management of a memory arrangement in an electronic printing system and, more specifically, to a technique for allocating memory to a component of the printing system, such as an image output terminal.

In an electronic printer, of the type known as DocuTech® and manufactured by Xerox® Corporation, various components ("clients"), such as a marking engine, are linked to a main memory by way of a system memory. In the preferred embodiment, the main memory preferably comprises a plurality of hard disks. The use of a plurality of hard disks to store redundant files is disclosed in the following patent:
U.S. Pat. No. 5,155,845
Patentees: Beal et al.
Issued: Oct. 13, 1992

For the above-mentioned electronic printer, files are transferred between the clients and the main memory through use of a resource manager, which resource manager schedules access to the disks for the clients. The data to be transferred to the disks is held in the system memory, the system memory being managed as a chain of buffers by the resource manager. To achieve such management, buffers assigned to specific clients are handed to the resource manager and then written to the main memory whenever bandwidth is available. Since each seek of the disks incurs a seek overhead, the number of seeks is minimized by chaining buffers together and transferring the chained buffers between a client and one of the disks in a single operation. For example, resource manager can link together buffers that are to be written to contiguous locations on one or more disks, the writing being responsive to attaining a preset threshold. Further information regarding an implementation of resource management can be obtained by reference to the following patent:
U.S. Pat. No. 5,142,667
Patentee: Dimperio et al.
Issued: Aug. 25, 1992
The pertinent portions of U.S. Pat. No. 5,142,667 are incorporated herein by reference.

In the DocuTech® system, files are preferably stored in one of two configurations: "replicated" files which have a copy on each disk, and "superdisk" files, segments of which are "striped" across each disk. A detailed description of these file configurations and the manner in which they are stored on the disks can be obtained by reference to the following:
U.S. patent application Ser. No. 07/678,926
Title: File Storage Process for Electronic Printing Systems having Multiple Disks
Filed: Apr. 1, 1991
The pertinent portions of U.S. patent application Ser. No. 07/678,926 are incorporated herein by reference.

In one embodiment, to produce prints with the DocuTech® system, compressed data is retrieved from main memory (e.g. from a plurality of disks) and directed through the buffers of the system memory to an image generator. The image generator serves to decompress the compressed image data and deliver it to an image output terminal ("IOT") for consumption thereby. In controlling the printing process of the IOT, a resource manager sets aside memory, for imaging of sheets at a future time, in view of information from marking software of the IOT. That is, each time the marking software indicates to the resource manager that a sheet is to be fed in the IOT, the resource manager sets aside a corresponding amount of memory to be used by the IOT in imaging that sheet. In view of client demand, however, the resource manager can only set aside so much memory for the IOT at any one time. Accordingly, once the resource manager has set aside a selected amount of memory for the IOT, further memory is not set aside for the IOT until some sheets are imaged by the IOT and the amount of memory requested by the IOT has decreased to an acceptable level. When the resource manager refuses to set aside memory for the IOT, the IOT is forced to print at less than peak performance, i.e. to skip a pitch, during the time interval in which a sheet would be fed in the IOT if an unlimited amount of memory could be set aside for the IOT. In this embodiment, the amount of memory set aside by the resource manager to image a given number of sheets tends to be far greater than the amount of memory actually required by the IOT. It would be desirable to provide a resource management scheme in which memory is reserved for imaging in accordance with actual, rather than perceived, needs of the IOT so that the amount of skipped pitches encountered by the IOT can be minimized.

In accordance with the present invention, there is provided a printing system for producing prints with each print including an image represented by image data, comprising: a memory for storing and buffering the image data of a selected print; an image output terminal, communicating with the memory, for printing the image of the selected print on a substrate; means, operatively associated with the image output terminal, for determining a value for the maximum amount of memory to be used in printing selected ones of the prints; and means, communicating with the determining means and the memory, for managing the memory, the managing means receiving the value from the determining means, the substrate being fed to the image output terminal when the managing means determines that the value corresponds with a selected amount of available memory space and that an additional predetermined condition is satisfied.

These and other aspects of the invention will become apparent from the following description, the description being used to illustrate a preferred embodiment of the invention when read in conjunction with the accompanying drawings.

Figure 2:
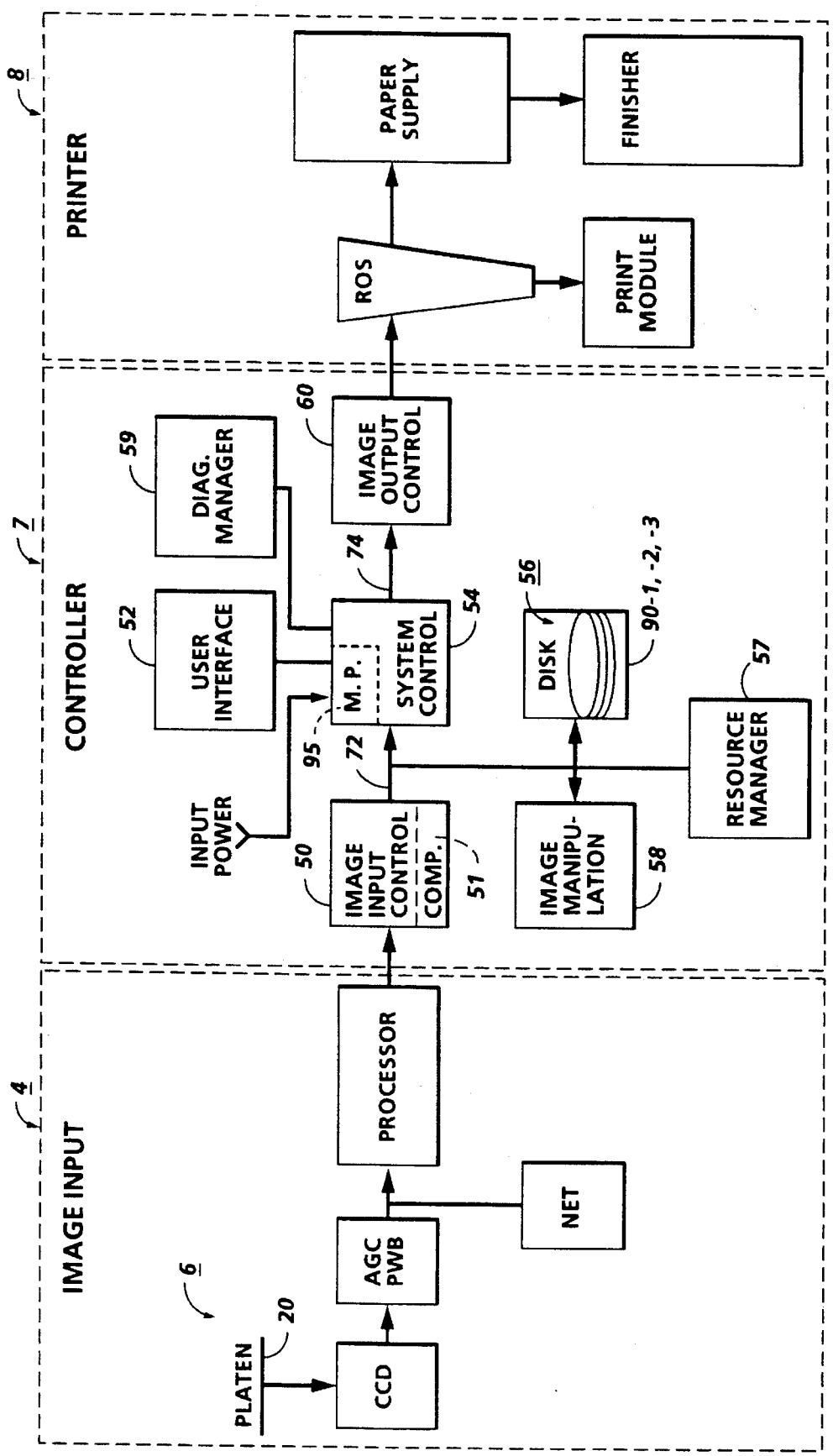
FIG. 2 is a block diagram of the electronic printing system of FIG. 1.
Figure 3:
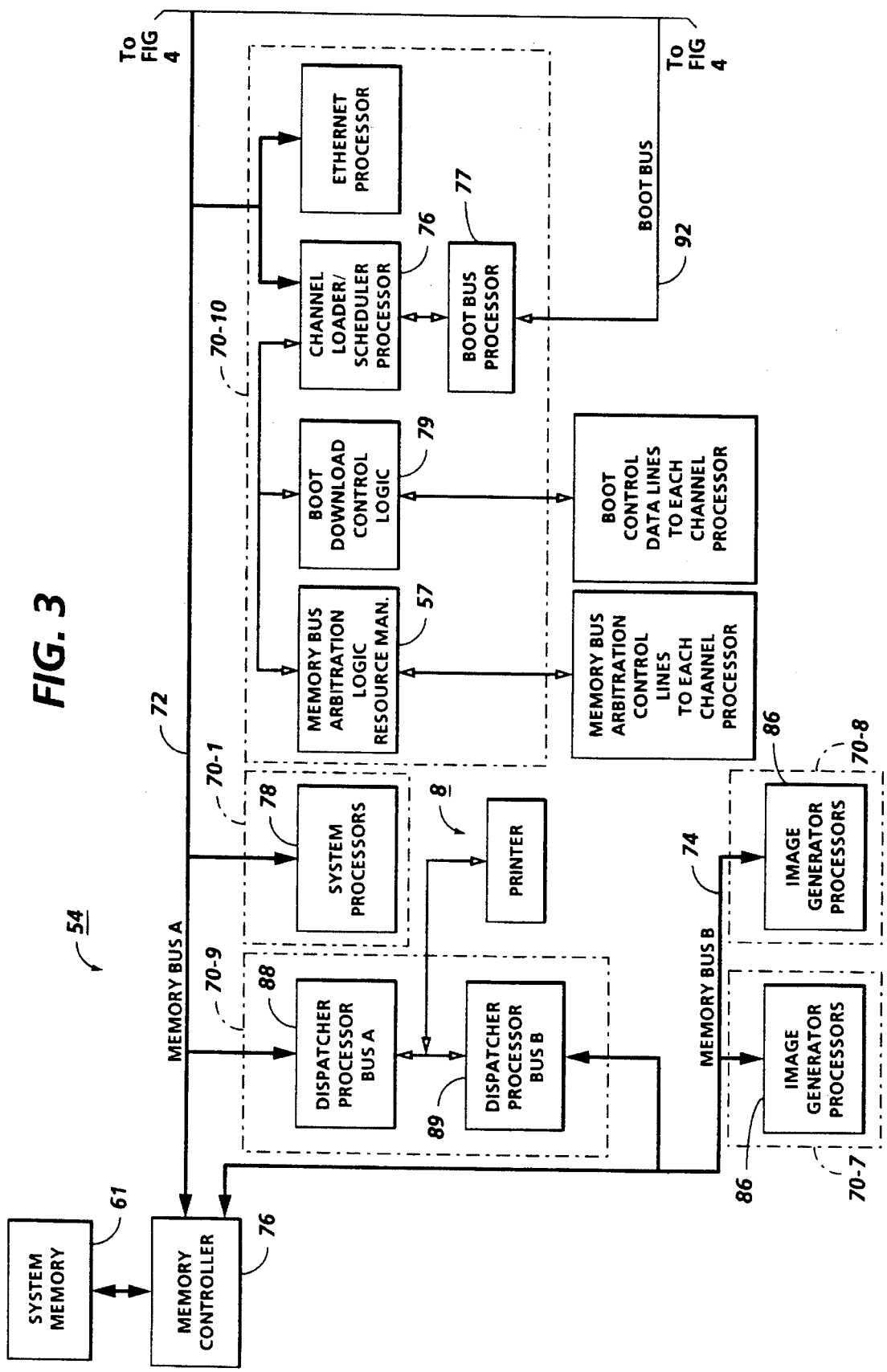
Figure 4:
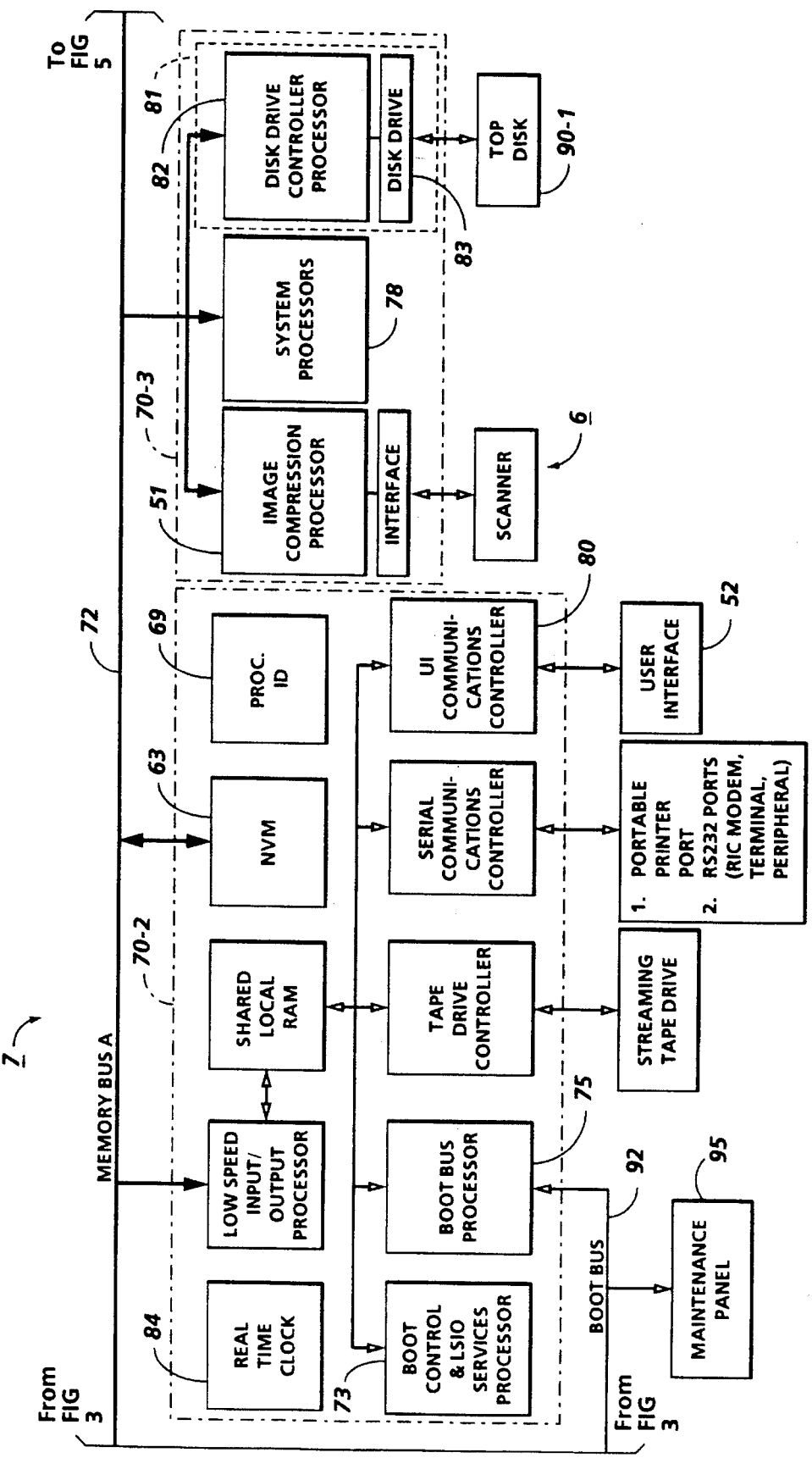
Figure 5:
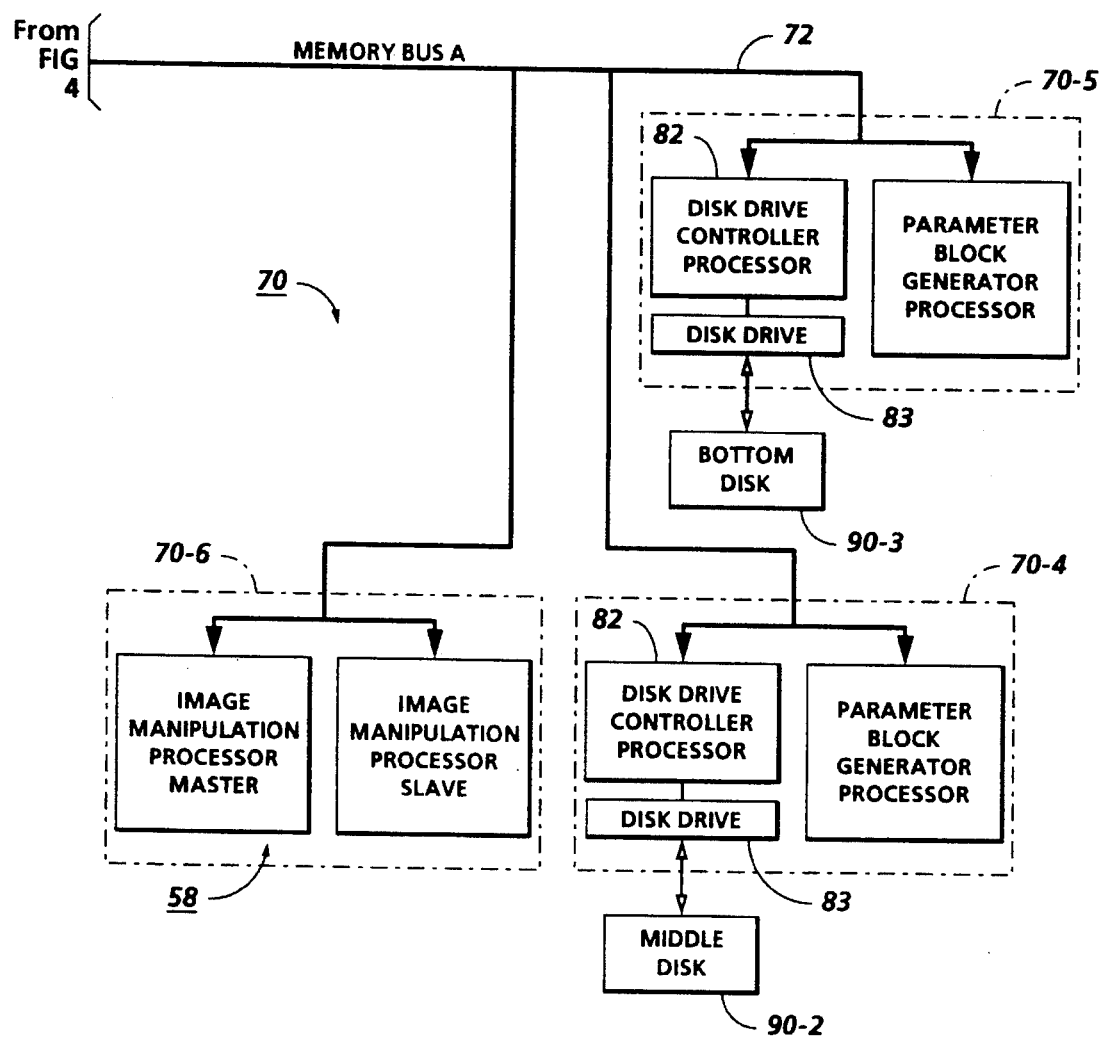
Figure 6:
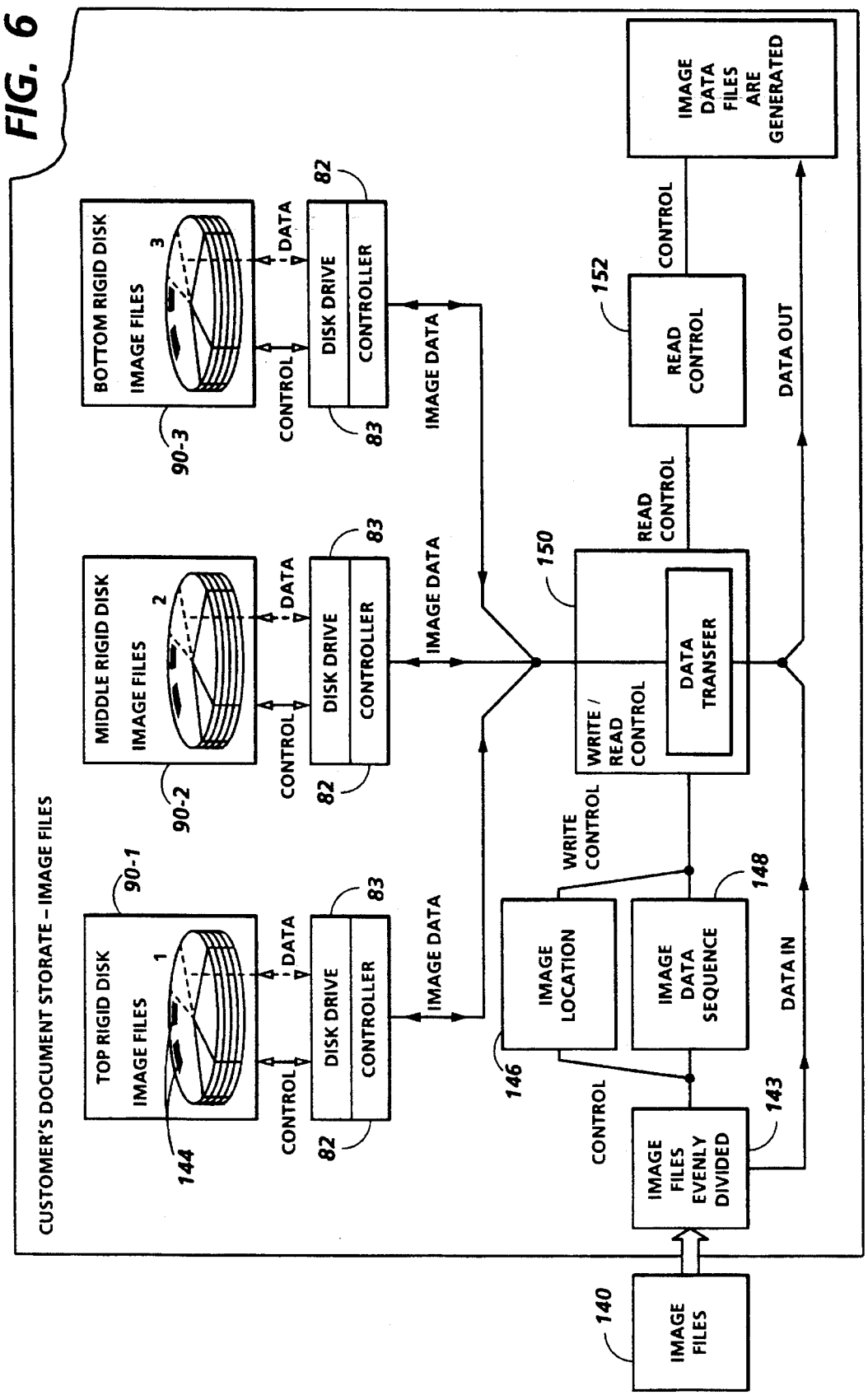
Figure 7:
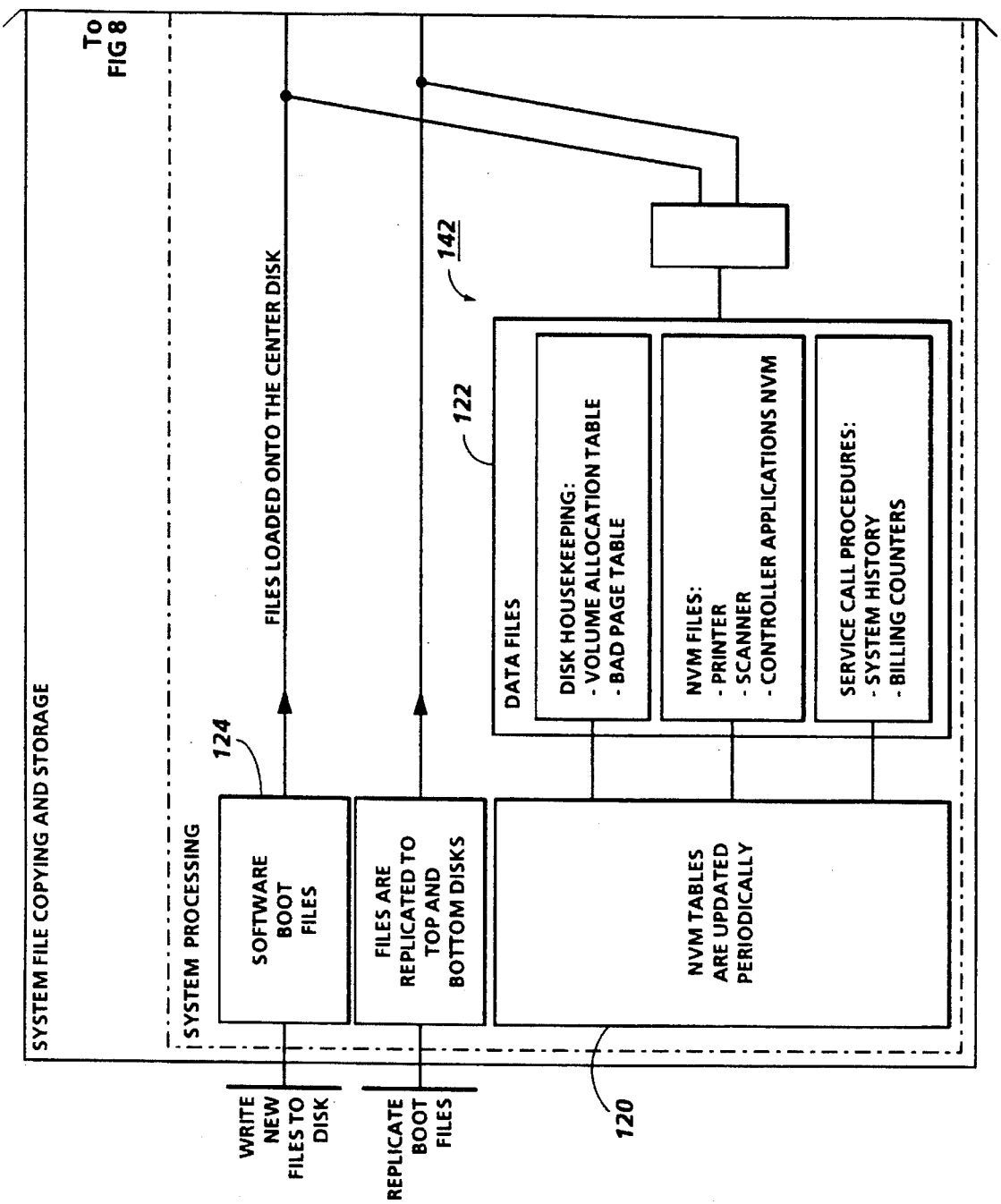
Figure 8:
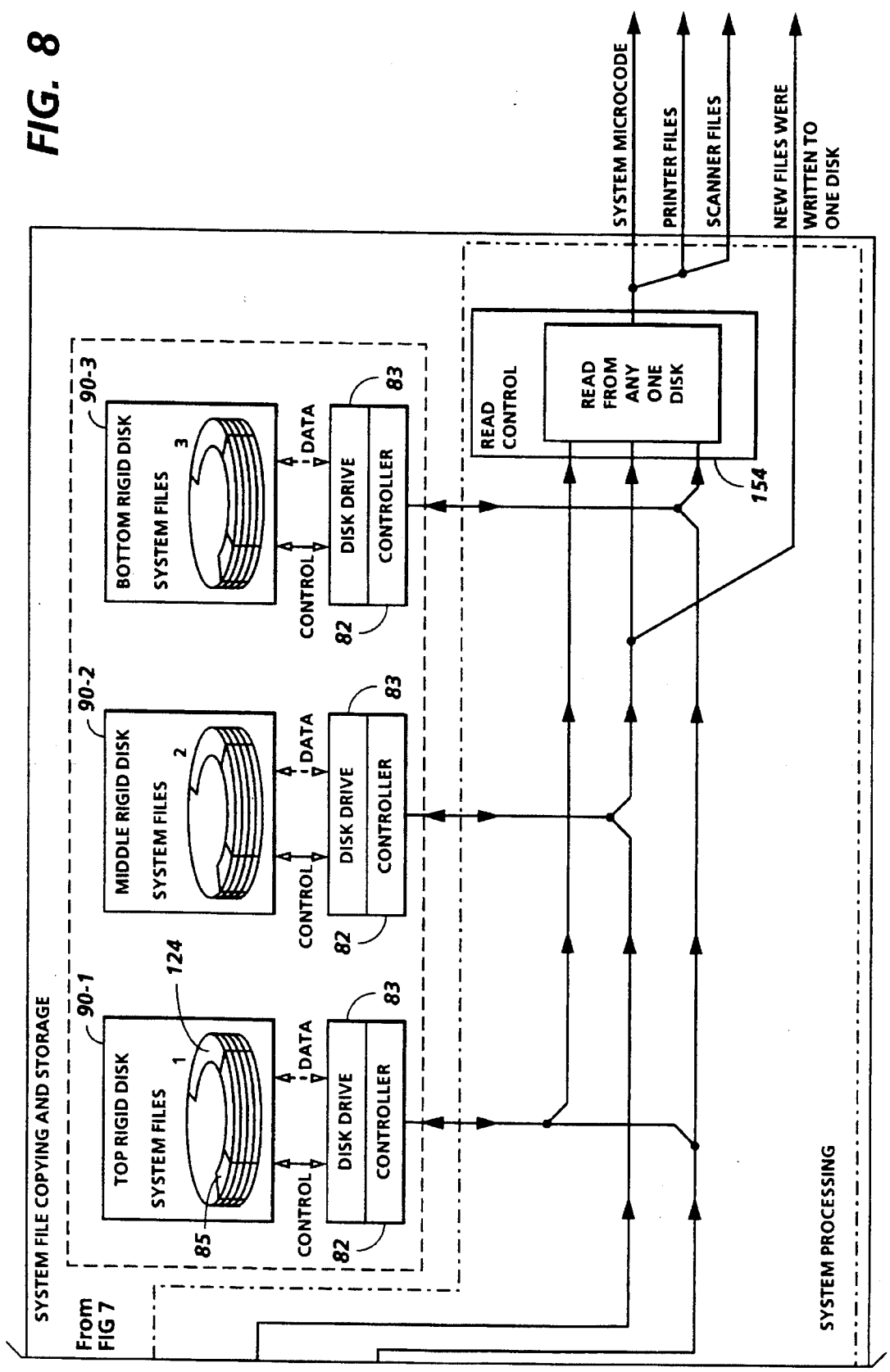
Figure 9:
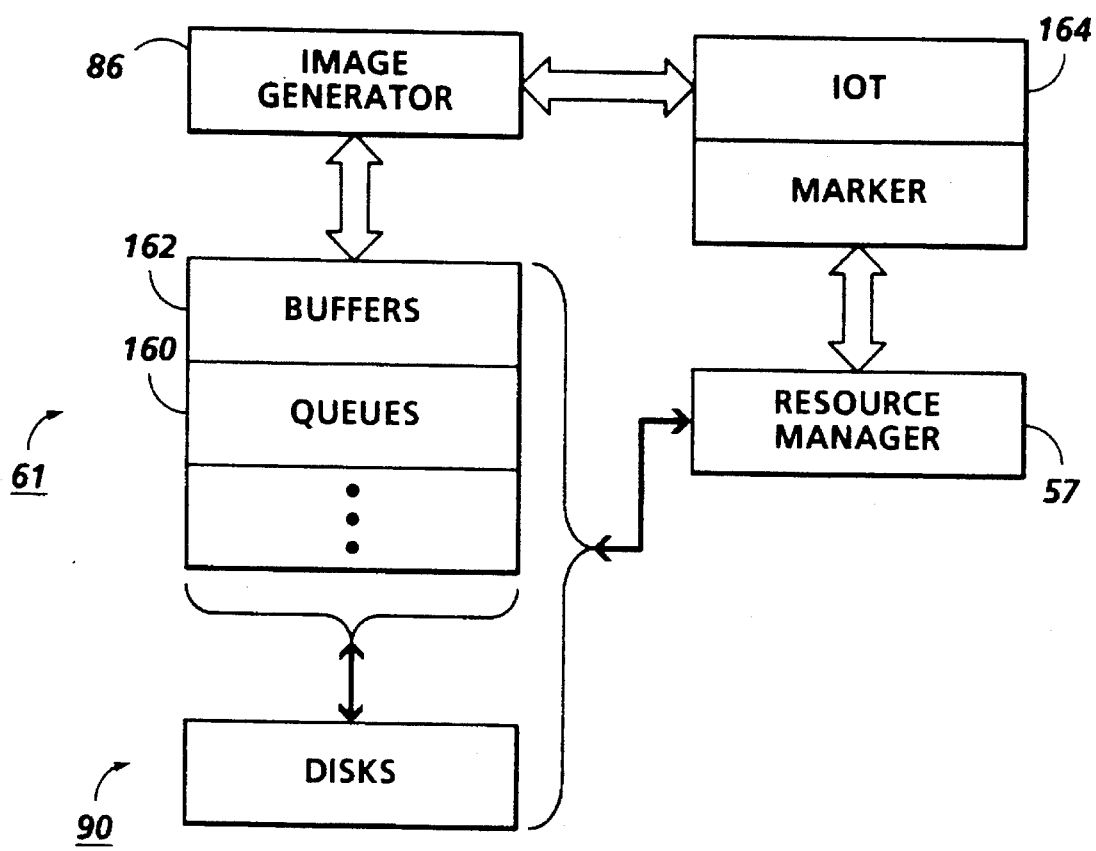
Figure 10:
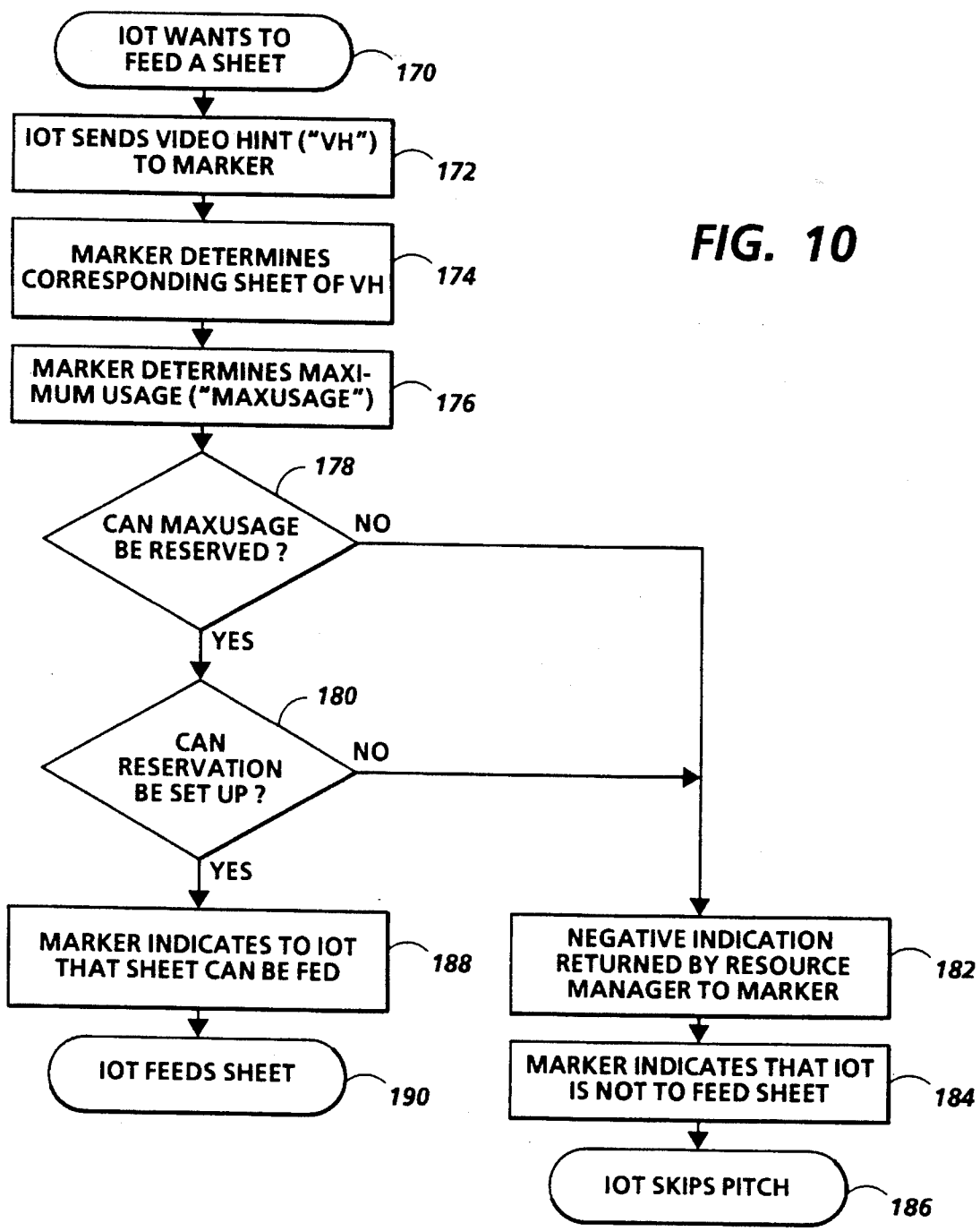
Figure 11:
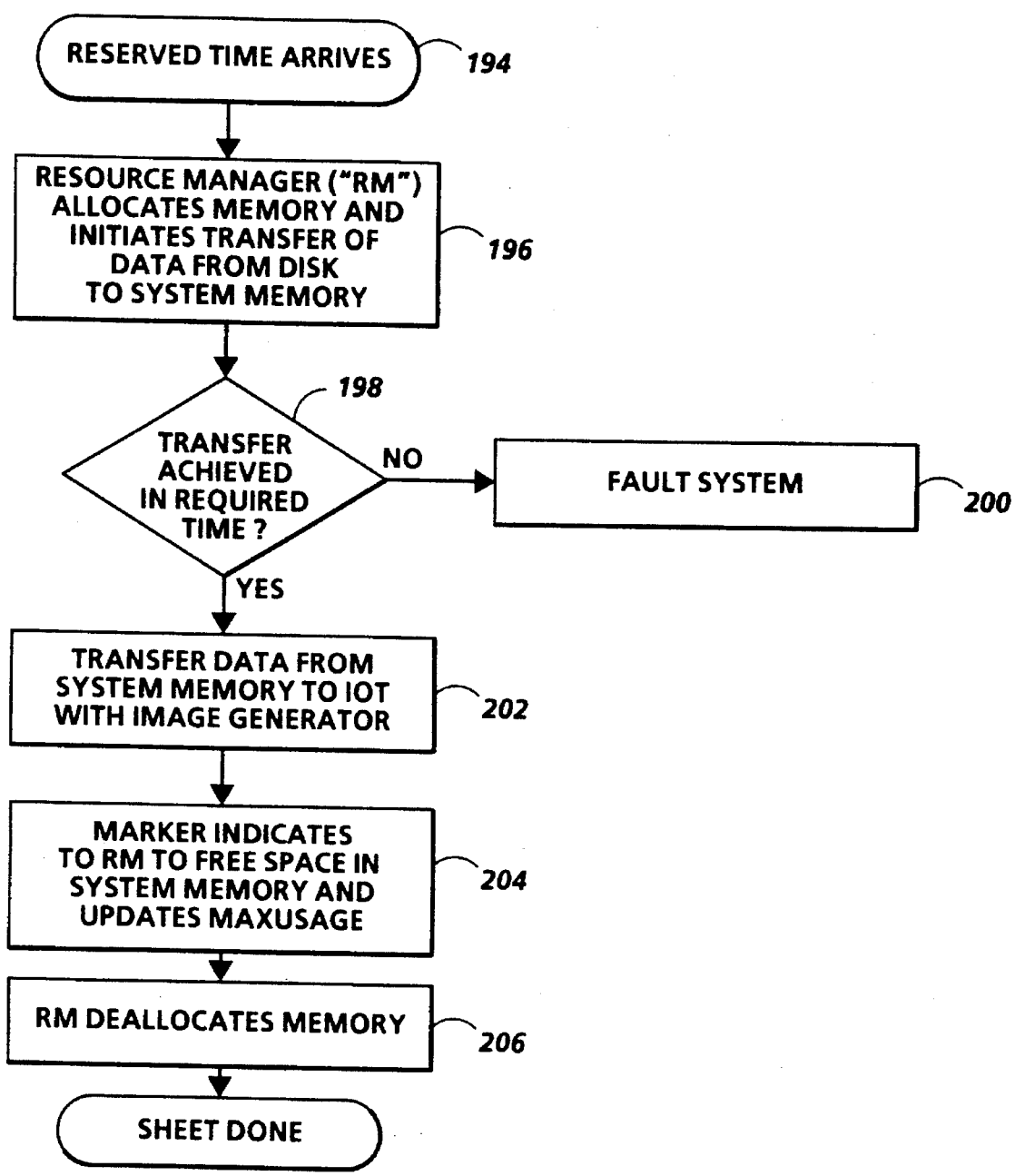

FIGS. 3–5 conjunctively represent a block diagram of the controller section of FIG. 2;

FIG. 6 is a block diagram depicting a technique for storing image files on the plurality of disk drive devices to provide super disk files;

FIGS. 7 and 8 conjunctively represent a block diagram depicting a technique for collecting system files and replicating them;

FIG. 9 is a schematic, block diagram of an arrangement for controlling the transfer of image data from the disk drive devices to the IOT with the control being facilitated by marking software of the IOT and a resource manager; and FIGS. 10 and 11 are flow diagrams depicting a technique, used with the control arrangement of FIG. 9, for insuring that image data is delivered to the IOT, for imaging, in a timely, yet acceptable manner.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
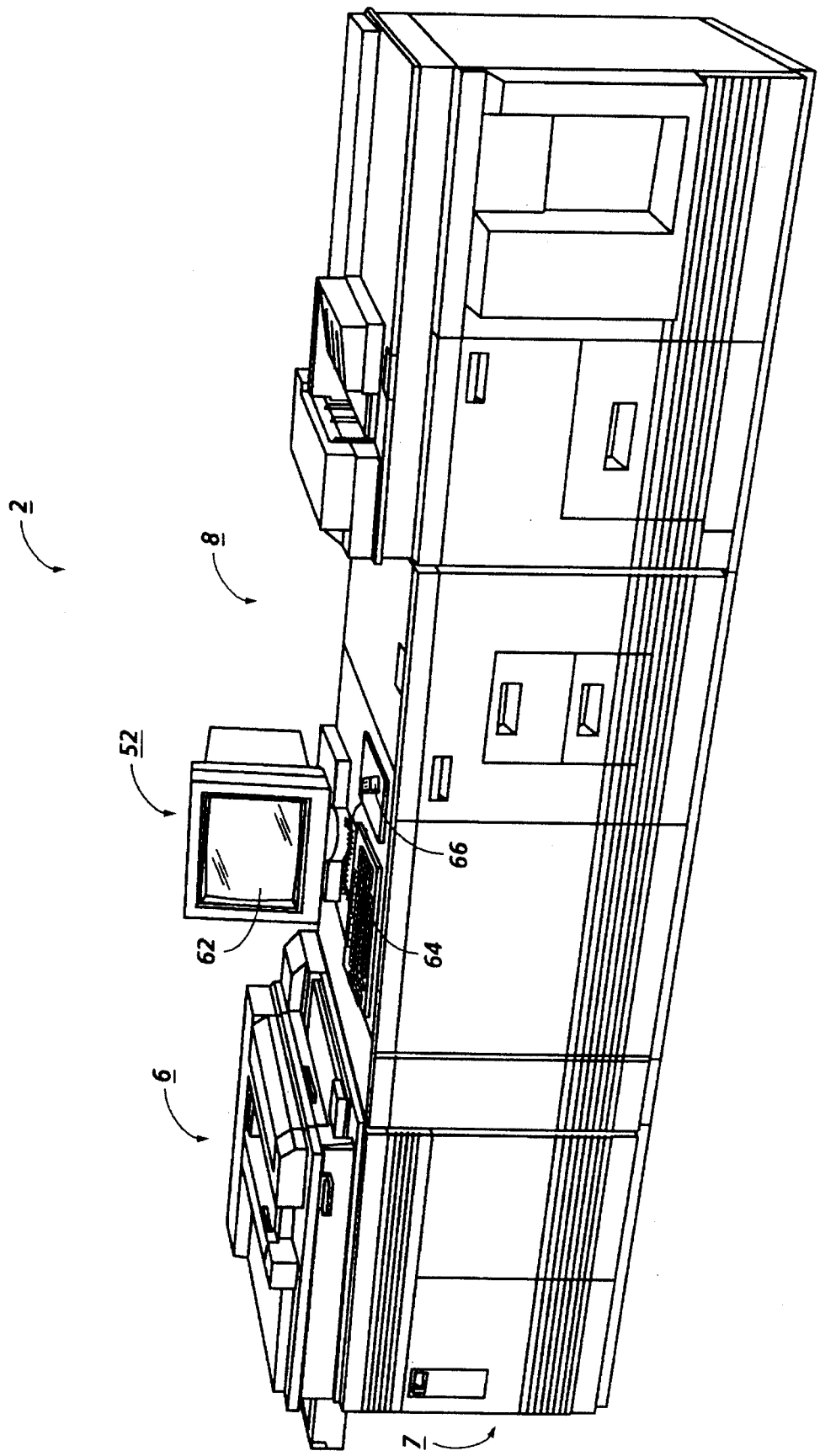
FIG. 1 is a perspective view of an electronic printing system upon which a technique of the present invention can be executed.

Referring to drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2 for purposes of explanation is divided into image input section 4, controller section 7, and printer section 8. In the example shown, image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and, furthermore, may be incorporated in electronic display systems, such as CRTs, LCDs, LEDs, etc. or else other image scanning/processing/recording systems, or else other signal transmitting/receiving, recording systems, etc. as well.

A more detailed description of printing system 2 may be found in copending U.S. patent application No. 07/620,519, filed Nov. 30, 1990, to James R. Graves et al, and entitled "System for Scanning Signature Pages", the disclosure of which is incorporated by reference herein.

Referring to FIG. 2, controller section 7 is, for explanation purposes, divided into an image input controller 50, User Interface (UI) 52, system controller 54, disk memory 56, image manipulation section 58, Resource Manager 57, Diagnostic Manager 59, and image output controller 60.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, visual document facsimile display, programming information and icons, diagnostic information and pictorial views, etc. Items displayed on touchscreen 62 such as files and icons are actuated by either touching the displayed item on screen 62 with a finger or by using mouse 66 to point a cursor to the item selected and keying the mouse.

Referring to FIGS. 2–5, the scanned image data input from scanner section 6 to controller section 7 is compressed by image compressor/processor 51 of image input controller 50 on PWB 70-3. The compressed image data with related image descriptors are placed in image files and temporarily stored in system memory 61 pending transfer to main memory 56 where the data is held pending use. A preferred procedure for storing image files is discussed below.

When the compressed image data in memory 56 requires further processing, or is required for display on touchscreen 62 of UI 52, or is required by printer section 8, the data is accessed in memory 56 and transferred to system memory 61. Where further processing other than that provided by processor of image input section 4 is required, the data is transferred to image manipulation section 58 on PWB 70-6 where additional processing steps such as collation, make ready (document editing), decomposition, rotation, etc. are carried out. Following processing, the data may be returned to main memory 56, sent to UI 52 for display on touchscreen 62, or sent to image output controller 60.

Resource Manager 57 controls access to disks and RAM 61 of files while diagnostic manager 59 handles system faults.

Image data output to image output controller 60 is decompressed and readied for printing and output to printer section 8. Image data sent to printer section 8 for printing is normally purged from memory 56 to make room for new image data.

As shown in FIGS. 3–5, controller section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural application or system processors 78; low speed I/O processor PWB 70-2 having UI communication controller 80 for transmitting data to and from UI 52, Boot Control & LSIO Services Processor 73, and Boot Bus Processor 75; PWBs 70-3, 70-4, 70-5 having disk drive controller/processors 82 with disk drives 83 for transmitting data to and from disks 90-1, 90-2, 90-3 respectively of main memory 56 (image compressor/processor 51 for compressing the image data and another application processor 78 are on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10 having Channel Loader/Scheduler Processor 76, Boot Bus Processor 77, Boot Download Control Logic 79, and Memory Bus Arbitration Logic/Resource Manager 57. Loader/Scheduler Processor 76 has two functions, one as a Boot channel to bring the system to the ready state and the other as a scheduler channel used to decide which channel performs which task and in which sequence the tasks will be performed.

Each independent processor and associated circuitry form a channel 81. Channels 81 (an example is shown in FIG. 4) are independent processors for handling the applications software, or input/output processors for handling peripheral devices such as disk drives. For example, there are disk channels used to interface disk drives 83 for disks 90-1, 90-2, 90-3, scanner interface channel, printer interface channel, etc.

Main memory 56 has plural hard disks 90-1, 90-2, 90-3 on which image files 140 and system files 142 are stored. For ease of discussion, the disks 90-1, 90-2 and 90-3 may be referred to simply as "disks 90". System files comprise system operating files such as boot files 124, software files, data files 122, font-related files, etc., while image files are, in one example, files of scanned image data. System files are viewed as critical because of their importance to the operation of the system while image files are viewed as non-critical since these files may be re-captured by re-scanning the source document.

System memory 61, which comprises a Random Access Memory or RAM, serves as a temporary store for data required during system operations. Memory 61 stores bits of data which can be written to (Data Entered) or read from (Data Used) the memory. Other data in memory 61 is used for reference and remains loaded as long as power is supplied. Since memory 61 is volatile, that is, all data is lost when power to memory 61 is terminated, Non Volatile Memory or NVM, which essentially comprise RAM memory with battery backup to supply DC voltage when power is turned off, are provided at several locations in the system as, for example, NVM 63 on Low Speed I/O Processor PWB 70-2 (FIG. 4). NVM 63 is used to store file management updates and file content updates.

Copending U.S. patent application No. 07/590,634, filed Sep. 28, 1990, to George L. Eldridge, and entitled "Method of Operating Disk Drives in Parallel", the disclosure of which is incorporated by reference herein, describes what will be referred to herein as Super Disk. Super Disk allows faster read/write access to files since all disks 90-1, 90-2, 90-3 can be accessed simultaneously. The risk incurred in this type of arrangement, however, is the loss of parts of a file should one or more of the disks fail which effectively results in loss of the entire file.

Referring to FIG. 6, to implement Super Disk, image files 140 to be transferred to disks 90-1, 90-2, 90-3 are divided by divider logic 143 into an even number of segments or sectors 144, each sector 144 being a preset number of bytes. The sectors are written in succession to successive disks until all of the sectors that comprise the image file are stored. Where N is equal to the number of disks, the total number of sectors 144 is an even multiple of N. In the example discussed, there are 3 disks 90-1, 90-2, 90-3 and therefore N=3. Accordingly, image files are divided into a plurality of sectors 144 which are in effect grouped into blocks of 3 sectors each. That is, sector 1 of image file 140 is written to disk 90-1, sector 2 to disk 90-2, sector 3 to disk 90-3, sector 4 to disk 90-1, sector 5 to disk 90-2, and so forth and so on. As will be understood, where the number of bytes in a file is not evenly divisible into sectors 144, one or more of the sectors 144 in the last block may be empty or partially empty of data. As a result, one larger storage media or super disk is effectively formed.

Image location logic 146 designates the location for each sector on disks 90-1, 90-2, 90-3, with the address of each corresponding block of sectors (.i.e., sectors 1, 2, 3; sectors 4, 5, 6, etc) being the same. Image data sequence logic 148 controls the disk writing sequence, while write/read control logic 150 provides the actual instructions to write or read image data to or from disks 90-1, 90-2, 90-3. Image data read from disks 90-1, 90-2, 90-3 is reconstructed by read control logic 152 which reads the image file sectors back from disks 90-1, 90-2, 90-3 in the same manner as the data was written to disks 90-1,90-2, 90-3.

Referring to FIGS. 7 and 8, system files 142 are normally permanent files which must be maintained. It should be recognized, however, that system files comprise other critical information, such as font-related information. To assure retention, system files 142 are replicated on each of the disks 90-1, 90-2, 90-3 at the same address. Replicated files are written simultaneously to all three disks 90-1, 90-2, 90-3, with the disk heads in the same position.

System files 142, whether updates 120 of data files 122 that occur periodically during operation and life of the system 2 or new files such as new or upgraded software entered as software boot files 124, are written to one disk, as for example center disk 90-2, through Disk Drive Control Processor 82 for disk 90-2. The system files are thereafter migrated to the other disks, in this case, top and bottom disks 90-1, 90-3. Read control 154 reads system files 142 from any one of the disks 90-1,90-2, 90-3. For additional explanation, reference is had to copending U.S. patent application No. 07/678,925, entitled "A Process For Replacing storage Media In Electronic Printing Systems", filed Apr. 1, 1990, the pertinent portions of which are incorporated by reference herein.

As a result, both super disk files (i.e., image files 140 with segments distributed equally across disks 90-1, 90-2, 90-3 of the system) and replicated files (i.e., duplicate system files 142 with copies on the disks 90-1, 90-2, 90-3) are created. When super disk files are accessed, all disks 90-1, 90-2, 90-3 are busy retrieving/storing data from/to disks. When a copy of a replicated file is accessed for reading, only one disk is busy.

Referring to FIG. 9, an arrangement, including various components of printing system 2 and the controller 7, shown in FIGS. 2 and 3–5, respectively, is shown. In the illustrated embodiment of FIG. 9, a memory, including system memory 61 and disks 90, is shown in communication with the resource manager 57. The system memory 61 includes, among other components, one or more queues 160 and a plurality of buffers 162. The structure and function of the queues 160, which queues serve to group and prioritize various transfers requested by clients, is discussed further in U.S. patent application Ser. No. 07/000,366 (Attorney's Docket No. 92499) filed Jan. 4, 1993, entitled "Dispatching and Scheduling Memory Operations in an Electronic Printing System", the pertinent portions of which are incorporated herein. More particularly, one of the queues 160 is a reserved queue in which print job requests from clients are maintained. The relationship between the buffers 162 and the resource manager 57 is discussed further in allowed U.S. patent application Ser. No. 07/589,951, filed Sep. 28, 1990, entitled "Synchronization of ESS/IIT When Scanning Complex Documents", the pertinent portions of which are incorporated herein by reference.

The resource manager 57 further communicates with an image output terminal ("IOT") 164, the IOT further comprising "marking software", the details of which will be discussed in further detail below. In one example, the IOT 164 includes a raster output scanning device ("ROS") (FIG. 2) coupled with a print module, the print module including a photoconductive member with its attendant imaging stations. For a discussion of the detailed structure and operation of the IOT 164 reference can be made to U.S. Pat. No. 5,175,679, the pertinent portions of which are incorporated herein.

The memory, and more particularly the buffers 162, communicate with the IOT 164 through use of the image generator 86. In particular, image data held in the buffers 162 is preferably compressed and the image generator includes a decompression scheme, of the type present in the DocuTech printing system, for decompressing the compressed data as it is passed to the IOT 164. The image generator is adapted to perform other conventional operations which serve to place the image data in form for printing with a ROS (FIG. 2).

The function of the arrangement of FIG. 9 can be better understood by reference to the following Table 1.

TABLE 1

| | scheduling Offset → | | | | duplex Scheduling Offset → | | | | | | | | | | | | |
|---|---|---|---|---|---|---|---|---|---|---|---|---|---|---|---|---|---|
| Page Time | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ | $t_{16}$ | $t_{17}$ |
| Video Hint | S1 | S2 | S3 | S4 | S5 | S6 | S7 | S8 | D1 | D2 | D3 | D4 | D5 | D6 | D7 | D8 | S9 ... |
| Video Request | | | | | S1 | S2 | S3 | S4 | S5 | S6 | S7 | S8 | D1 | D2 | D3 | D4 | D5 ... |
| IG | | | | | | S1 | S2 | S3 | S3 | S5 | S6 | S7 | S8 | D1 | D2 | D3 | D4 ... |
| $Buffer_0$ | | | | | S1 | S1 | | S3 | S3 | S5 | S5 | S7 | S7 | | D2 | D2 | D4 | D4 ... |
| $Buffer_1$ | | | | | | | | | | | | | | D1 | | D3 | D3 | D5 ... |
| $Buffer_2$ | | | | | | S2 | S2 | S4 | S4 | S6 | S6 | S8 | S8 | | | | ... |
| Memory Used | | | | | $P1_S$ | $P1_S$ + $P2_S$ | $P3_S$ + $P2_S$ | $P3_S$ + $P4_S$ | $P5_S$ + $P4_S$ | $P5_S$ + $P6_S$ | $P7_S$ + $P6_S$ | $P7_S$ + $P8_S$ | $P1_d$ + $P8_S$ | $P1_d$ + $P2_d$ | $P3_d$ + $P2_d$ | $P3_d$ + $P4_d$ | $P5_d$ + $P4_d$ ... |

Table 1 relates to an example in which eight duplex prints are to be printed. For ease of discussion, it is assumed, initially, that, as each substrate or sheet is fed in the IOT, the corresponding image data for the sheet can be retrieved from the disks 90 and imaged on the sheet in a timely manner. In the Table 1, each sheet side is designated as either S1, S2, . . . S8 (for simplex 1, simplex 2, and so on) or D1, D2, . . . D8 (for duplex 1, duplex 2, and so on). That is, each "S" represents one side of a substrate or sheet and the corresponding "D" represents the other side of the sheet. In operation, a "video hint" is issued by the IOT 164 and received by the marking software each time the IOT seeks to feed a substrate or sheet therein. In accordance with these video hints, a sheet is fed, and one or more page times ("pitches") are reserved in the buffers 162. For example, when a video hint is received by the marking software for S1 and D1, at $t_1$, memory is reserved at $t_4$, $t_5$, $t_{13}$ and $t_{14}$. Memory for S2 and D2 is thereafter reserved at $t_6$, $t_7$, $t_{14}$ and $t_{15}$, and so on.

With the above information, Table 1 can be comprehended fully by the following discussion examining the manner in which S1, S2 and S3 are printed. After a scheduling offset for $t_1$ occurs, a video request for S1 is initiated (at $t_5$) so that the reserved memory is allocated at $t_5$ and the image data for S1 is transferred from the disks 90 to one of the buffers 162, namely $Buffer_0$, during $t_5$. In allocating image data at $t_5$, enough memory to accommodate the first side of S1 ("$P1_S$") is used. As should be appreciated, for any sheet to be duplexed which is designated by an Sn/Dn pair (e.g. S1/D1), $Pn_S$ relates to memory used for one side of the sheet and $Pn_D$ relates to the memory used for the other side of the sheet. At $t_6$, the image generator 86 (in response to an "IG" signal) causes the image data for S1 to be decompressed and transferred to the IOT 164 for imaging on the sheet fed at $t_1$. During $t_6$, image data is set up in $Buffer_2$, and at $t_7$, that image data is transferred from the $Buffer_2$ to the IOT for imaging. In allocating memory at $t_6$, enough memory to accommodate sides $P1_S$ and $P2_S$ is used. Sometime between $t_6$ and $t_7$, the space for S1 is deallocated and the $Buffer_0$ is set up for the image data of S3. In allocating memory at $t_7$, enough memory to accommodate sides of $P2_S$ and $P3_S$ is used.

As should appear from Table 1, each time a sheet is imaged, memory is deallocated and the "Memory Used" row changes accordingly. Moreover, it should be appreciated that the video hints and video requests are generated by the IOT 164, the Memory Used row is managed by the marking software and buffer reservation/allocation is managed by the resource manager 57. Moreover, it will be appreciated that the functions of the marking software are associated with the IOT 164, but are not necessarily performed by the IOT. That is, in the preferred embodiment, the marking software ("marker" of FIG. 9) resides in the controller 7 (FIG. 2) as the image output control 60. Finally, the information regarding memory used is passed over to the resource manager at regular intervals for the type of use explained below.

It should be recognized that the above discussion assumes that each time a sheet is fed, the corresponding image, stored preferably in the disks 90, can be delivered to the IOT 164 in a timely manner, i.e. the image data corresponding to the image can be set up in one pitch and transferred from the buffers 162 to the IOT 164 in another pitch. Moreover, the above discussion assumes that the resource manager 57 will set aside as much memory in the buffers 162 as desired by the marker. These two assumptions, however, do not always hold true. In the preferred embodiment, the validity of both of these assumptions is checked with the following implementation.

Referring to FIG. 10, a scheme for determining if a sheet should be fed in the IOT 164, and thus whether space should be reserved in one of the buffers 162, is shown. The process of FIG. 10 begins when the IOT, at step 170, indicates that it wants to feed a sheet. Accordingly, this desire to feed a sheet is indicated to the marker, step 172, and the marker determines, at step 174, which sheet is to be scheduled at the time of the video hint. For example, as indicated above, in the exemplary scheme of Table 1, S1 and D1 are scheduled to be fed at $t_1$ and $t_9$, respectively, and so on. As the marker receives a video hint, it seeks, via step 176, 178 and 180 to make a reservation for the sheet(s) corresponding to the video hint. An example of how the technique is used to reserve both memory and time for S1 and D1 (Table 1) should provide a comprehensive view, to those of ordinary skill in the art, of the manner in which the technique of FIG. 10 functions.

Pursuant to receiving the video hint at $t_1$, the marker, in conjunction with the resource manager 57, determines if space in the $Buffer_0$ can be reserved for S1 and if space in the $Buffer_1$ can be reserved for D1. First, the marker considers the complexity of the sheet sides, and accordingly the amount of memory space required for S1 and D1, i.e. the magnitudes of $P1_S$ and $P1_D$, (step 176). The marker then determines which of $P1_S$ and $P1_D$ is the greater, and, hence, which one of the two is to serve as "MAXUSAGE".

In general, MAXUSAGE, i.e. the maximum amount of memory used to image one or more sheets, is equal to the greatest value present in the Memory Used row of Table 1. The value of MAXUSAGE is passed to the resource manager 57 and the resource manager determines, via step 178, whether the magnitude of MAXUSAGE exceeds the amount of available memory allocated for the IOT. It will be appreciated by those skilled in the art that the value of MAXUSAGE will vary as sheets, in addition to S1 and D1, are scheduled for imaging. For example, when S2 and D2 are reserved, the value of MAXUSAGE will change since either ($P1_S+P2_S$) or ($P1_D+P2_D$) is, inevitably, greater than either $P1_S$ or $P1_D$. In the preferred embodiment, as explained in further detail below, each time a sheet is fed in the IOT 164, the Memory Used row is scanned and the value of MAXUSAGE updated.

It will further be appreciated, in view of the resource manager related patent applications mentioned herein, that the available memory will vary in accordance with client demand of the printing system 2. If the magnitude of MAXUSAGE is greater than the magnitude of the available memory, then the process proceeds to steps 182, 184 and 186 where the IOT is instructed to skip a pitch (step 186). That is, if enough memory is not available, then a pitch is skipped and neither S1 is fed nor any buffer space reserved for S1/D1 until enough memory becomes available.

Second, if enough memory is available, then the process proceeds to step 180 where the resource manager 57 determines if two criteria are met for S1 and D1. For the first criterium, the marker indicates to the resource manager certain information about S1 and D1, e.g. time period in which S1 and D1 are to be reserved and disk operations associated with transferring image data for S1 and D1 from the disks 90 to the system memory 61. With this information, the resource manager seeks to calculate the time required to make the transfer of image data. If the calculation cannot be made within a preselected time interval, then the process proceeds to steps 182, 184 and 186. For the second criterium, the resource manager determines, from the above-calculation, if the disk operations can be performed in $t_5$ and $t_{13}$. If the disk operation cannot be performed in $t_5$ and $t_{13}$, then the process proceeds to steps 182, 184 and 186. Assuming that a logical YES is returned for steps 178 and 180, then S1 is fed in the IOT and reservations are made in the Buffer$_0$, for S1, at $t_5$ and $t_6$ and the Buffer$_1$, for D1, at $t_{13}$ and $t_{14}$ (steps 188 and 190).

Referring to FIG. 11, an approach for transferring buffered image data from a buffer in the system memory 61 to the IOT 164 is shown. An example of how the technique is used to transfer the image data for S1 should suffice to provide a comprehensive view, to those of ordinary skill in the art, of the manner in which the technique of FIG. 11 functions. Once the reserved time, namely $t_5$ and $t_6$, arrives (:step 194), the resource manager 57 allocates the reserved space in Buffer$_0$ (:step 196) and proceeds to initiate the transfer of image from the disks 90 to the Buffer$_0$, i.e. initiates the set up of image data for S1. If the set up of image data cannot, for any reason, be achieved within a preselected time interval (step 198) (despite the checks performed in the technique of FIG. 10), then the system is faulted (step 200). In one example, the set up can be achieved as a result of an error being generated in the disk scheduling algorithm disclosed by the above-incorporated patent application 07/000,366 (Attorney's Docket No. 92499).

Assuming that the image data for S1 is set up in the Buffer$_0$ within the preselected time interval, namely $t_5$, then the the image data is transferred, at step 202, from the Buffer$_0$ to the IOT 164, during $t_6$. When the transfer is complete, the marker updates MAXUSAGE by subtracting $P1_S$ and scanning the Memory Used row for the current value of MAXUSAGE. Once the marker indicates, to the resource manager 57 that the transfer is complete and provides the resource manager with the current value of MAXUSAGE, the resource manager deallocates the memory space used for S1 (step 206).

Numerous features of the disclosed embodiment will be appreciated by those skilled in the art. One feature of the disclosed embodiment is to maximize the the efficiency of the IOT. Since the memory requests of the IOT tend to be within reason, the resource manager is able to meet the memory needs of the IOT without exceeding resource manager allocation limits. That is, because the value of MAXUSAGE tends to be less than the memory made available for the IOT, the IOT rarely is required to skip pitches on the basis that its memory allocation requests are inordinately large. Another feature of the disclosed embodiment is to maximize the efficiency of the printing. That is, since the resource manager operates on the basis of the actual, rather than the perceived, needs of the IOT, the resource manager does not set aside any more memory than is actually required by the IOT. Accordingly, since the resource manager sets aside memory for the IOT in an efficient manner, the resource manager is able to optimize distribution of memory to other clients in the printing system.

What is claimed is:

1. In a printing system with memory for storing and buffering image data for use in producing a group of prints with each print being based on a portion of the stored and buffered image data, the printing system allocating memory space of the memory to one or more of a plurality of clients, one of which clients includes an image output terminal, communicating with the memory, for producing the group of prints, a memory management system, for optimizing memory allocation to the image output terminal, comprising:

a marking manager, communicating with the image output terminal, for determining maximum memory allocation required to store image data for producing a selected subgroup of the group of prints, said marking manager determining the maximum memory allocation by reading a group of memory allocation requests at selected time intervals, the group of memory allocation requests varying prior to or after at least one of the selected time intervals so that said determination of maximum memory allocation is dynamic;

a memory manager, communicating with the memory and said marking manager, for allocating memory space to the clients based on current demand for memory space by the clients, said marking manager requesting a memory allocation based on the determined maximum memory allocation; and said memory manager determining whether the requested memory allocation from said marking manager is feasible based on current demand for memory space by the clients and, when the requested memory allocation from said marking manager is feasible, said memory manager granting the requested memory allocation from said marking manager so that memory space for storing image data corresponding with a portion of the group of prints is made available for the image output terminal.

2. The memory management system of claim 1, in which the memory includes, a mass memory section for storing the image data corresponding with the group of prints, and a plurality of buffers communicating with said mass memory, wherein said memory manager reserves one or more of the plurality of buffers, for use by the image output terminal, when it is determined, with said memory manager, that the requested memory allocation from said marking manager is feasible based on current demand for memory space by the clients.

3. The memory management system of claim 2, in which a substrate is fed to the image output terminal for producing the portion of the group of prints, wherein said memory manager allocates the one or more of the plurality of buffers to receive the image data corresponding with the portion of the group of prints at a time subsequent to the feeding of the substrate to the image output terminal.

4. The memory management system of claim 3, in which the one or more buffers communicates with the image output terminal, wherein when the image data corresponding with the portion of the group of prints is transferred to the image output terminal, said memory manager deallocates memory space associated with the one or more buffers so that the same one or more buffers are made available to receive image data corresponding with another portion of the group of prints.

5. The memory management system of claim 3, in which a second substrate is fed to the image output, subsequent to the feeding of the substrate, for producing a second portion of the group of prints, wherein, said marking manager reads the group of memory allocation requests subsequent to the feeding of the substrate and prior to the feeding of the second substrate.

6. The memory management system of claim 1, wherein the image output terminal skips a pitch when said memory manager determines that the image data corresponding with the portion of the group of prints cannot be transferred from the memory to the image output terminal within a selected time interval.

7. The memory management system of claim 1, further comprising an image generation subsystem for transferring the image data corresponding with the portion of the group of prints from the memory to the image output terminal.

8. The memory management system of claim 1, in which the group of prints is represented by compressed image data, wherein said image generation subsystem includes a decompressor for decompressing the image data corresponding with the portion of the group of prints.

9. The memory management system of claim 1, wherein the image output terminal is disposed remotely of the memory.

* * * * *